United States Patent
Burclaff et al.

(10) Patent No.: US 11,878,285 B2
(45) Date of Patent: Jan. 23, 2024

(54) CATALYST TREATMENT TO IMPROVE CORROSION RESISTANCE

(71) Applicant: LUMMUS TECHNOLOGY LLC, Houston, TX (US)

(72) Inventors: Philip A. Burclaff, Weston, WI (US); Dominic Bush, Wausau, WI (US); Bryan J. Kumfer, Ringle, WI (US)

(73) Assignee: LUMMUS TECHNOLOGY LLC, Houston, TX (US)

( * ) Notice: Subject to any disclaimer, the term of this patent is extended or adjusted under 35 U.S.C. 154(b) by 267 days.

(21) Appl. No.: 17/265,968

(22) PCT Filed: Jul. 26, 2019

(86) PCT No.: PCT/US2019/043623
§ 371 (c)(1),
(2) Date: Feb. 4, 2021

(87) PCT Pub. No.: WO2020/033166
PCT Pub. Date: Feb. 13, 2020

(65) Prior Publication Data
US 2021/0291148 A1  Sep. 23, 2021

Related U.S. Application Data

(60) Provisional application No. 62/715,473, filed on Aug. 7, 2018.

(51) Int. Cl.

| | |
|---|---|
| *B01J 21/04* | (2006.01) |
| *B01J 23/46* | (2006.01) |
| *B01J 37/08* | (2006.01) |
| *C02F 1/02* | (2023.01) |
| *C02F 1/74* | (2023.01) |
| *C02F 103/36* | (2006.01) |

(52) U.S. Cl.
CPC ............. *B01J 21/04* (2013.01); *B01J 23/462* (2013.01); *B01J 37/08* (2013.01); *C02F 1/74* (2013.01); *C02F 2103/365* (2013.01)

(58) Field of Classification Search
CPC .......... B01J 21/04; B01J 23/462; B01J 37/08; C02F 1/025; C02F 1/74
See application file for complete search history.

(56) References Cited

U.S. PATENT DOCUMENTS

| | | | |
|---|---|---|---|
| 4,141,828 A | * | 2/1979 | Okada ................. C02F 1/725 210/762 |
| 4,294,706 A | | 10/1981 | Kakihara et al. |
| 4,380,680 A | | 4/1983 | Arena |
| 2004/0138317 A1 | | 7/2004 | Xie et al. |
| 2012/0252665 A1 | | 10/2012 | Hughes et al. |
| 2021/0323854 A1 | | 10/2021 | Kumfer et al. |

FOREIGN PATENT DOCUMENTS

| | | |
|---|---|---|
| CN | 103298741 A | 9/2013 |
| CN | 103359821 A | 10/2013 |
| CN | 105618067 A | 6/2016 |
| CN | 107442148 A | 12/2017 |
| CN | 12839907 A | 5/2021 |
| EP | 0431932 A1 | 6/1991 |
| JP | S55152591 A | 11/1980 |
| JP | 2017164671 A | 9/2017 |
| WO | 2004043852 A1 | 5/2004 |

OTHER PUBLICATIONS

Yunrui et al., Chemosphere, (2007), v.66, p. 145-150. (Provided previously).*

Qing Xu et al: "The Contribution of Alumina Phase Transformations to the Sintering of Pd Automotive Catalysts" Topics in Catalysis, Kluwer Academic Publishers-Plenum Publishers, NE, vol. 55, No. 1-2, Feb. 10, 2012 (Feb. 10, 2012), pp. 78-83, XP035023015.

Yunrui et al: "Catalytic activity of Ru/Al"20"3 for ozonation of dimethyl phthalate in aqueous solution" Chemosphere, Pergamon Press, Oxford, GB, vol. 66, No. 1, Nov. 19, 2006 (Nov. 19, 2006), pp. 145-150, XP005729532.

PCT International Search Report and Written Opinion of the International Searching Authority dated Nov. 8, 2019 corresponding to PCT Application No. PCT/US2019/043623 filed Jul. 26, 2019.

Liu Pingle et al. / Preparation and characterization of carbon nanofiber washcoat on macroporous a—alumina support.

Hideshi Hattori et al. / Solid acid catalysis May 31, 2016 p. 132-133.

* cited by examiner

*Primary Examiner* — Yong L Chu
(74) *Attorney, Agent, or Firm* — Calfee, Halter & Griswold LLP

(57) ABSTRACT

There are provided systems and processes that provide a robust α-alumina supported catalyst for the wet air oxidation or hydrolysis treatment of wastewaters having a pH of 9 or greater.

11 Claims, No Drawings

CATALYST TREATMENT TO IMPROVE CORROSION RESISTANCE

FIELD

The present invention relates generally to catalysts for use in wastewater treatment systems, to methods for improving corrosion resistance of such catalysts in the treatment of high pH wastewater streams, and to methods of wastewater treatment.

BACKGROUND

Wastewaters can be effectively treated with wet-air oxidation (WAO) or hydrolysis (for components that do not respond as well to oxidation). To improve the kinetics of the reaction and render the treatment process more feasible for industrial wastewater treatment, catalysts can be utilized, particularly with hydrolysis processes. By way of example, transition metals such as platinum, palladium, and ruthenium are used as catalysts. While such catalysts, e.g., ruthenium, appear to be an excellent catalyst for promoting hydrolysis of organic contaminants, a catalyst bed made entirely from these materials would be unreasonably expensive and a waste of material. Accordingly, the metal may instead be dispersed on a substrate (support) to maximize surface area of the metal while minimizing its total mass. Typical substrates include ceramics (e.g., alumina, silicon carbide) or carbon. The more robust the support, however, the more expensive the supported catalyst is as well. For example, of the above listed three options (alumina, silicon carbide, or carbon), silicon carbide is the most resistant to degradation but also the most expensive, and thus it would be desirable to find a less expensive, equally robust material.

In addition, while aluminum oxide (alumina) costs much less than silicon carbide from the catalyst manufacturers, its use is limited to a pH of less than 9. At a pH of 9 or greater, the present inventors have found that alumina-supported catalysts lose their structural integrity. This becomes an issue since a number of high pH wastewaters have been identified where catalytic hydrolysis is effective. Aside from catalyst selection, other options for processing high pH wastewater streams include treating the wastewater prior to catalytic hydrolysis or wet air oxidation to meet the pH limitations of the alumina substrate. This adds further process steps, materials, and time, all of which are undesirable. Accordingly, there is a need in the art for robust catalysts suitable for catalytic wet air oxidation or hydrolysis of high pH (9 or greater) wastewaters that are less expensive than silicon carbide-based options.

SUMMARY

The present inventors have developed processes for stabilizing an alumina support material having a catalyst deposited thereon such that the alumina-supported catalyst may be safely utilized in the treatment of wastewaters, e.g., spent caustics, at a pH of 9 or greater. The stabilization process comprises heating an alumina support to a temperature and for a duration effective to bring the alumina to its more stable α-phase. Once treated, the highly stable α-alumina form is able to better withstand the highly caustic environment associated with the catalytic hydrolysis or wet air oxidation of highly pH wastewater. In certain embodiments, the alumina support is coated with a catalytic material prior to heat treatment. By heat treating the alumina-supported catalyst vs. heat treating the support and then applying the catalyst, the standard manufacturing process for a supported catalyst is not significantly changed and its costs savings are realized. Once heat treated, the catalyst on the α-alumina support acts to promote the oxidation or hydrolysis of contaminants, namely organic contaminants, in wastewater while the α-alumina support withstands the high pH environment of the wastewater.

In accordance with an aspect of the invention, there is provided a process for stabilizing an alumina-supported catalyst comprising alumina in a form other than α-alumina and a catalyst deposited thereon, the process comprising heating the alumina-supported catalyst at a temperature effective to transform at least a portion of the alumina to its α-alumina form and produce a stabilized α-alumina supported catalyst.

In accordance with another aspect, there is provided a process for stabilizing an alumina-supported catalyst comprising alumina and a catalyst supported thereon, the process comprising heating the catalyst at a temperature of at least 1200° C. for a duration of at least 1 hour.

In accordance with an aspect, there is provided a wastewater treatment process comprising:
  (i) heating an alumina-supported catalyst comprising alumina in a form other than α-alumina and a catalyst deposited thereon at a temperature effective to transform at least a portion of the alumina to its α-alumina form and produce a stabilized α-alumina supported catalyst; and
  (ii) subjecting a wastewater stream comprising an amount of contaminants therein and having a pH of 9 or greater at a wet air oxidation or hydrolysis process in the presence of the stabilized α-alumina supported catalyst to reduce an amount of the contaminants in the wastewater stream.

In accordance with another aspect, there is provided a wastewater treatment process comprising:
  heating an alumina-supported catalyst comprising alumina in a form other than α-alumina and a catalyst deposited thereon at a temperature of at least 1200° C. for a duration of at least 1 hour to form a stabilized α-alumina supported catalyst; and
  (ii) subjecting a wastewater stream comprising an amount of contaminants therein and having a pH of 9 or greater at a wet air oxidation or hydrolysis process in the presence of the stabilized α-alumina supported catalyst to reduce an amount of the contaminants in the wastewater stream.

In accordance with yet another aspect, there is provided a catalyst comprising an α-alumina support having a coating of a catalyst thereon.

DETAILED DESCRIPTION

To explain more fully, in accordance with a first aspect of the present invention, there is provided a process for treating an alumina-supported catalyst (comprising a form of alumina other than its α-phase) to transform at least a majority of the underlying alumina support material to its α-phase. The resulting stabilized α-alumina supported catalyst is suitable for use as a high pH (≥9) catalyst for the wet air oxidation or hydrolysis of contaminants in a wastewater stream. Prior to heat treatment, the alumina may be provided from any suitable source, such as a commercially available source of alumina. In an embodiment, prior to heat treatment, at least a portion of the alumina is in a non-alpha phase, such as a gamma, eta, and/or lambda phase. The resulting stabilized α-alumina supported catalyst comprises an α-alumina support having a coating of a catalyst thereon. It is appreciated that the term "stabilized α-alumina supported catalyst" refers to an alumina supported catalyst produced by the heat treatment processes described herein that has at least a majority (>50%) of its alumina in the α-phase. In certain embodiments, all of the alumina of the stabilized α-alumina supported catalyst is in the α phase.

The catalyst for the alumina support is selected such that its activity and physical state is not significantly altered by the heat treatment processes described herein. Preferably, the catalyst is one that is not melted at the temperatures necessary to transform at least a portion of the underlying non-alpha phase alumina support to its alpha phase. In an embodiment, the catalyst one suitable for the catalytic wet air oxidation or catalytic hydrolysis of contaminants in wastewater stream having a pH of 9 or greater.

In particular embodiments, the catalyst is selected from the group consisting of nickel, a platinum group metal, and combinations thereof. The platinum group metals comprise ruthenium, rhodium, palladium, osmium, iridium, and platinum. In particular embodiments, the catalyst comprises ruthenium. By way of example, present inventors have found that ruthenium is particularly suitable for the hydrolysis of contaminants in a wastewater stream having a pH of 9 or more. The catalyst may be provided on the support in any suitable thickness for the particular application. In addition, the catalyst may be deposited on the substrate by any suitable medium, such as a typical vapor deposition process. The resulting alumina-supported catalyst after deposition of the catalyst may be of any suitable particle size, such as from 1 to 100 millimeter.

While not wishing to be bound by theory, it is believed that the α-phase of alumina is not catalytically active, but provides a robust support for the selected catalyst for wet air oxidation or hydrolysis of contaminants in a high pH (9 or greater) stream. Via experimentation (see Example below), the present inventors surprisingly found that an α-alumina supported catalyst heat treated as described herein maintained its integrity in treating a contaminated stream via wet air oxidation or hydrolysis at a pH of 9 or more (e.g., pH 10) over time.

Returning to the heat treatment process to provide the stabilized α-alumina supported catalyst, the process comprises heating the alumina-supported catalyst (which comprises alumina in the non-alpha phase) to a temperature effective to bring at least a majority of the alumina catalyst to the α-phase. To reiterate, the heating is preferably done at a temperature less than a melting point of the supported catalyst so as not to disturb the integrity of the catalyst for future use or to avoid loss of the catalyst. In an embodiment, the heating is done at a temperature of at least 1200° C., and in a particular embodiment from 1250° C. to 1350° C. In addition, the heating is done for a time suitable to ensure a desired degree of transformation of the alumina to its α-phase. In an embodiment, the heating at the temperature of at least 1200° C. for a time period of at least 1 hour, and in a particular embodiment from 1 to 4 hours. It is appreciated that it may not be desirable to suddenly expose the alumina supported catalyst to high temperatures. Doing so may, for example, result in cracking or other thermal stress related damage. Accordingly, in an embodiment, the heating the alumina-supported catalyst comprises ramping to the temperature of least 1200° C. at a rate of 15-25° C. per minute, and in a particular embodiment at 20° C. per minute. In an embodiment, the starting temperature of the temperature ramp is from 20-150° C.

In accordance with another aspect of the present invention, once the catalyst is adequately treated, the α-alumina supported catalyst may be utilized for the treatment (via wet air oxidation or hydrolysis) of contaminants in a wastewater stream having a pH of 9 or greater. In particular, the process includes contacting a wastewater stream comprising an amount of contaminants therein and having a pH of 9 or greater with the stabilized alumina-supported catalyst under conditions effective to reduce (lower) an amount of the contaminants in the wastewater stream.

The wastewater stream may comprise any aqueous stream which may benefit from a catalytic hydrolysis process as described herein. In an embodiment, the wastewater stream comprises a fluid having a pH of 9 or greater and which includes an amount of inorganic or organic contaminants therein which can be treated (eliminated or an amount of reduced) by a catalytic wet air oxidation or a catalytic hydrolysis process. In an embodiment, the wastewater stream comprises a stream from an industrial process. In an embodiment, the wastewater stream comprises a wastewater stream from the production of propylene oxide and styrene monomer (POSM). The production of POSM is typically done via the reaction of propylene and ethylbenzene to produce the propylene oxide and styrene monomer.

In other embodiments, the wastewater stream comprises a spent caustic, such as a refinery spent caustic, a naphthenic spent caustic, a cresylic spent caustic, and a sulfidic spent caustic as is known in the art. These streams are typically of a high pH (9 or greater) and comprise an amount of chemical oxygen demand (COD) or other contaminants which can be reduced by a catalytic wet air oxidation or hydrolysis process as described herein. In an embodiment, the contaminants comprise an amount of organic contaminants (undesired organic compounds).

As used herein, the term "refinery spent caustic" refers to spent caustic generated in the operation of equipment and processes such as those which may be found at a petroleum refinery. Refinery spent caustic may have high levels of chemical oxygen demand (COD), in some cases between about 400,000 mg/L and 500,000 mg/L or more. Refinery spent caustic may contain one or more of naphthenic spent caustics or cresylic spent caustics. As used herein, the term "about" refers to a value which is ±1% of the stated value.

Naphthenic spent caustics may be produced from the scrubbing of kerosene and jet fuels and may contain high concentrations of organic compounds consisting of naphthenic acids, and also may contain phenol compounds and reduced sulfur compounds. Naphthenic spent caustics may also contain high levels COD, in some cases greater than 100,000 mg/L. Cresylic spent caustics may be produced from the scrubbing of gasoline and may contain high concentrations of phenol compounds (cresylic acids) and may also contain reduced sulfur compounds. Sulfidic spent caustics may be produced from the scrubbing of hydrocarbons and may contain high concentrations of reduced sulfur compounds, such as sulfides and mercaptans, as well as organic carbon concentrations.

The wastewater stream is subjected to a treatment process to reduce an amount of contaminants therein, wherein the treatment process comprises wet air oxidation process or a hydrolysis process in the presence of the catalyst. The treatment process may begin by delivering at least a portion of the wastewater to one or more dedicated vessels formed from a suitable inert material for carrying out the subject wet air oxidation or hydrolysis reactions. In one embodiment, the wastewater is subjected to wet air oxidation. In another embodiment, the wastewater is subject to a hydrolysis process. Wet air oxidation is an aqueous phase oxidation process using added molecular oxygen contained in air (or any other oxygen containing gas) as an oxidant. The process is operated at an elevated temperature and elevated pressure relative to atmospheric conditions. For example, some wet air oxidation systems may operate at temperatures and pressures which may range from about 120° C. (248° F.) to 320° C. (608° F.) and 760 kPa (110 psig) to 21,000 kPa (3000 psig), respectively. The utilization of higher treatment temperatures may reduce the amount of time required for a desired level of treatment.

When the wastewater is instead or additionally subjected to hydrolysis, it is appreciated that the hydrolysis may take place within the same or a like vessel as the wet air oxidation process, but that oxygen is not added. The hydrolysis process is also carried out under conditions (time, temperature, and duration) effective to reduce an amount of contaminants in the wastewater stream. In an embodiment, the treatment process (wet air oxidation and/or hydrolysis) is effective to reduce an amount of contaminants below a predetermined level. For example, in an embodiment, the treated stream comprises a chemical oxygen demand (COD) of 10,000 mg/L or less COD, and in certain embodiments 3,000 mg/L or less.

In the systems and processes described herein, it is appreciated that one or more inlets, pathways, outlets, mixers, pumps, valves, coolers, energy sources, flow sensors, or controllers (comprising a microprocessor and a memory), or the like may be included in any of the systems described herein for facilitating the introduction, output, timing, volume, selection, and direction of flow of any of the components or materials set forth therein. Moreover, the skilled artisan would understand the volumes, flow rates, concentrations, and other parameters necessary to achieve the desired result(s) can be determined by known processes.

The function and advantages of these and other embodiments of the present invention will be more fully understood from the following examples. These examples are intended to be illustrative in nature and are not considered to be limiting the scope of the invention.

Example

An amount of a catalyst comprising ruthenium supported on alumina was prepared. The alumina-supported catalyst was then stabilized by firing it in a furnace at 1250° C. for two hours. This temperature was below the melting point of the ruthenium on the surface of the alumina so as to avoid melting and loss of the ruthenium, but high enough to cause the alumina to change its crystalline form to the more stable α-alumina form. The resulting catalyst was subjected to a synthetic POSM waste stream having a pH of 10 and a COD of 114,000 mg/L. As the below table illustrates, the alumina supported catalyst heat treated as described herein resulted in significantly less catalyst loss over the expected duration (Total Hours) for a treatment process for oxidizing or reducing an amount of contaminants in a high pH (>9) wastewater stream.

TABLE 1

| Catalyst | Feed | Wt. Catalyst Start (g) | Wt. Catalyst End (g) | % Loss | Total Hours |
|---|---|---|---|---|---|
| Ru on alumina - | POSM pH-10 260° C. | 15 | 9.2 | 38.7 | 152 |
| as is Ru on alumina - heat treated | POSM pH-10 260° C. | 15 | 15.3 | 0 | 140 |

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wastewater treatment process comprising:
heating an alumina-supported catalyst comprising alumina in a form other than α-alumina and a catalyst deposited thereon at a temperature effective to transform at least a portion of the alumina to its α-alumina form and produce a stabilized α-alumina supported catalyst; and
subjecting a wastewater stream comprising an amount of contaminants and having a pH of 9 or greater to a wet air oxidation or hydrolysis process in the presence of the stabilized α-alumina supported catalyst to reduce an amount of the contaminants in the wastewater stream.

2. The process of claim 1, wherein the wastewater is subjected to a hydrolysis process.

3. The process of claim 1, wherein the wastewater is subjected to a wet air oxidation process.

4. A wastewater treatment process comprising:
heating an alumina-supported catalyst comprising alumina in a form other than α-alumina and a catalyst deposited thereon at a temperature effective to transform at least a portion of the alumina to its α-alumina form and produce a stabilized α-alumina supported catalyst; and
subjecting a wastewater stream comprising an amount of contaminants and having a pH of 9 or greater to a wet air oxidation or hydrolysis process in the presence of the stabilized α-alumina supported catalyst to reduce an amount of the contaminants in the wastewater stream, wherein the wastewater stream comprises a wastewater stream from the production of propylene oxide and styrene monomer (POSM).

5. The process of claim 4, wherein the heating step further comprises heating the alumina-supported catalyst to a temperature greater than 1200° C.

6. The process of claim 5, wherein the heating step further comprises heating the alumina-supported catalyst to a temperature between 1250° C. and 1350° C.

7. The process of claim 5, wherein the heating step further comprises heating the alumina-supported catalyst to a temperature between 1200° C. and 1350° C. for at least one hour.

8. The process of claim 1, wherein the heating step further comprises heating the alumina-supported catalyst to a temperature greater than 1200° C.

9. The process of claim 8, wherein the heating step further comprises heating the alumina-supported catalyst to a temperature between 1250° C. and 1350° C.

10. The process of claim 8, wherein the heating step further comprises heating the alumina-supported catalyst to a temperature between 1200° C. and 1350° C. for at least one hour.

11. The process of claim 4, wherein the contaminants comprise an amount of chemical oxygen demand (COD).

* * * * *